(12) United States Patent
Bettesworth et al.

(10) Patent No.: US 10,462,205 B2
(45) Date of Patent: Oct. 29, 2019

(54) PROVIDING MODIFIES PROTOCOL RESPONSES

(71) Applicant: INTERNATIONAL BUSINESS MACHINES CORPORATION, Armonk, NY (US)

(72) Inventors: Gary S. Bettesworth, Basingstoke (GB); Andreas Martens, Fair Oak (GB); Sam Rogers, Winchester (GB); Paul S. M. Thorpe, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 15/070,240

(22) Filed: Mar. 15, 2016

(65) Prior Publication Data
US 2017/0270207 A1 Sep. 21, 2017

(51) Int. Cl.
*G06F 17/30* (2006.01)
*H04L 29/08* (2006.01)
(Continued)

(52) U.S. Cl.
CPC ............ *H04L 67/02* (2013.01); *G06F 16/951* (2019.01); *G06F 16/9535* (2019.01);
(Continued)

(58) Field of Classification Search
CPC ......... G06F 17/30867; G06F 17/30864; G06F 17/3053; G06F 17/30554; G06F 17/30528; G06F 17/30648; G06F 17/30392; G06F 17/3064; G06F 17/2235; G06F 17/30395; G06F 17/30699; G06F 16/9535; G06F 16/951; G06F 16/24578; G06F 16/248; G06F 16/24575; G06F 16/90324;
(Continued)

(56) References Cited

U.S. PATENT DOCUMENTS

| 7,904,403 B2 | 3/2011 | Birsan et al. |
| 7,984,007 B2 | 7/2011 | Reumann et al. |

(Continued)

OTHER PUBLICATIONS

Reliasoft, "Team-Based Problem Solving Methods and XFRACAS," ReliaSoft Newsletter, vol. 7, Issue 1, Copyright ©1992 ReliaSoft Corporation, http://www.reliasoft.com/newsletter/v7i1/team_based.htm, Printed on Dec. 31, 2015, pp. 1-4.

(Continued)

*Primary Examiner* — Dangelino N Gortayo
(74) *Attorney, Agent, or Firm* — Robert C. Bunker

(57) ABSTRACT

A first search request is received. Keywords of the first search request is identified. A request in a protocol for the first search request is transmitted to a web service. A response in the protocol for the first search request is received from the web service. Whether the first search quest is similar to a previously submitted search request, is determined. Responsive to determining that the first search request is similar to the previously submitted search request, the protocol response is modified to include contact information of a user that previously submitted the similar search request. The modified protocol response is transmitted to the client computer system from which the first search request originated.

9 Claims, 5 Drawing Sheets

(51) Int. Cl.
  *G06F 16/9535* (2019.01)
  *G06F 16/951* (2019.01)
  *G06F 16/2457* (2019.01)
  *G06F 16/248* (2019.01)
  *G06F 16/9032* (2019.01)

(52) U.S. Cl.
  CPC ...... *G06F 16/248* (2019.01); *G06F 16/24578* (2019.01); *G06F 16/90324* (2019.01)

(58) Field of Classification Search
  CPC ............. G06F 16/3326; G06F 16/2423; G06F 16/3322; G06F 16/335; G06F 16/9038
  USPC ........ 707/706, 721, 723, 728, 732, 733, 748
  See application file for complete search history.

(56) References Cited

U.S. PATENT DOCUMENTS

| | | | |
|---|---|---|---|
| 8,010,528 B2 | 8/2011 | Nastacio et al. | |
| 8,291,319 B2 | 10/2012 | Li et al. | |
| 8,849,810 B2 * | 9/2014 | Lucovsky | G06F 17/30864 707/728 |
| 9,047,345 B1 * | 6/2015 | Liu | G06F 17/30867 |
| 9,087,121 B2 | 7/2015 | Bhatt et al. | |
| 9,092,523 B2 * | 7/2015 | Tanne | G06F 3/0482 |
| 9,251,260 B2 * | 2/2016 | Satalkar | G06F 17/30864 |
| 9,477,720 B1 * | 10/2016 | Gyongyi | G06F 17/30554 |
| 9,760,610 B2 * | 9/2017 | Sinha | G06F 16/24578 |
| 10,042,940 B2 * | 8/2018 | Agarwal | G06Q 10/00 |
| 10,142,441 B2 * | 11/2018 | Bursey | H04L 67/306 |
| 2011/0173175 A1 * | 7/2011 | Cone | G06F 17/30867 707/708 |
| 2011/0231383 A1 * | 9/2011 | Smyth | G06F 16/3349 707/707 |
| 2012/0158720 A1 * | 6/2012 | Luan | G06F 17/30867 707/732 |
| 2013/0097144 A1 * | 4/2013 | Siamwalla | G06F 17/30699 707/706 |
| 2013/0132497 A1 | 5/2013 | Partridge et al. | |
| 2014/0101193 A1 * | 4/2014 | Dorohonceanu | G06F 16/9535 707/769 |
| 2015/0006492 A1 * | 1/2015 | Wexler | G06F 16/248 707/694 |
| 2015/0178302 A1 * | 6/2015 | Plakhov | G06F 16/90324 707/706 |
| 2016/0140230 A1 * | 5/2016 | Villeneuve | G06F 16/951 707/706 |
| 2018/0060443 A1 | 3/2018 | Bettesworth et al. | |

OTHER PUBLICATIONS

Mell et al., "The NIST Definition of Cloud Computing", National Institute of Standards and Technology, Special Publication 800-145, Sep. 2011, pp. 1-7.

Fisher, "Link Prefetching FAQ," MDN, Last Modified on Mar. 3, 2003, p. 1-5, https://developer.mozilla.org/en-US/docs/Web/HTTP/Link_prefetching_FAQ, Accessed on Oct. 30, 2017.

IBM, "List of IBM Patents or Patent Applications Treated as Related (Appendix P)," Jun. 7, 2018, p. 1-2.

* cited by examiner

PROVIDING MODIFIES PROTOCOL RESPONSES

BACKGROUND OF THE INVENTION

The present invention relates generally to the field of providing modified protocol responses to computer systems connected to an enterprise computing environment, and more particularly including additional information in a protocol response, based on similar search requests submitted by users of computer systems connected to the enterprise computing environment.

SUMMARY

Embodiments of the present invention provide systems, methods, and computer program products for providing modified protocol responses. A first search request is received. Keywords of the first search request is identified. A request in a protocol for the first search request is transmitted to a web service. A response in the protocol for the first search request is received from the web service. Whether the first search request is similar to a previously submitted search request, is determined. Responsive to determining that the first search request is similar to the previously submitted search request, the protocol response is modified to include contact information of a user that previously submitted the similar search request. The modified protocol response is transmitted to the client computer system from which the first search request originated.

DETAILED DESCRIPTION

An enterprise computing environment may involve a number of computer systems. A user of a computer system in the enterprise computing environment can perform searches via internet and/or intranet applications, such as a web search engine. For example, the user may experience a problem with a computer system and attempt to resolve the problem by searching for potential solutions. Each time the user searches for a potential solution, the user may receive and navigate through a plurality of search results. Each time the user performs a search, search session information may be recorded. The search session information may be stored in the enterprise computing environment, such that users connected to the enterprise computing environment can receive search session information for similar searches.

The user connected to the enterprise computing environment may take a long time to navigate the search results and identify a potential solution that can be used to assist the user in resolving their problem. The user may also navigate the search results and determine that the received search results do not provide sufficient detail to assist the user in resolving their problem. It may be advantageous to provide the user with additional information when search results are returned to the user, such that the user can receive search session information for similar searches. Accordingly, the user can use the received search session information to contact other users connected to the enterprise computing environment that performed similar searches, as well as access internet and/or intranet content that the other users accessed during their respective search session.

Embodiments of the present invention provide methods, systems, and computer program products for determining whether users connected to an enterprise computing environment perform similar searches. Embodiments of the present invention can modify a search response returned to a user, if it is determined that other users connected to the enterprise computing environment performed a similar search, such that the search response returned to the user includes search session information for the other users regarding the similar search.

Figure 1:
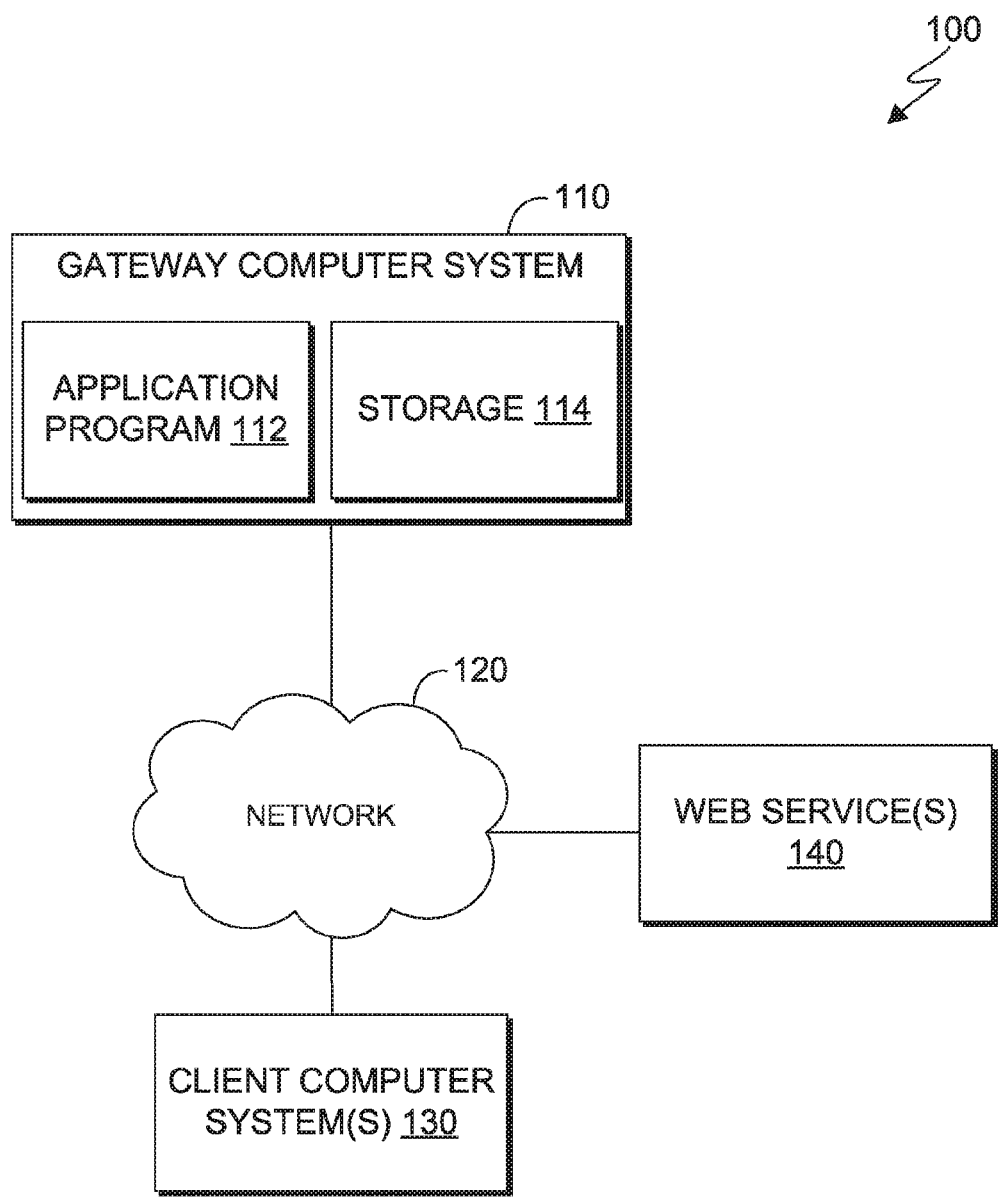
FIG. 1 is a block diagram of an enterprise computing environment, in accordance with an embodiment of the present invention.

FIG. 1 is a functional block diagram of enterprise computing environment 100, in accordance with an embodiment of the present invention. Enterprise computing environment 100 includes gateway computer system 110, one or more client computer systems 130, and one or more web services 140 connected via network 120.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between gateway computer system 110, one or more client computer systems 130, and one or more web services 140, in accordance with an embodiment of the present invention.

Client computer systems 130 and gateway computer system 110 can be desktop computers, laptop computers, specialized computer servers, or any other computer systems known in the art. In certain embodiments, client computer systems 130 and gateway computer system 110 represent computer systems utilizing clustered computers and components to act as a single pool of seamless resources when accessed through network 120. In certain embodiments, client computer systems 130 and gateway computer system 110 represent virtual machines. In general, client computer systems 130 and gateway computer system 110 are representative of any electronic devices, or combination of electronic devices, capable of executing machine-readable program instructions, as described in greater detail with regard to FIG. 3. In other embodiments, client computer systems 130 and gateway computer system 110 may be implemented in a cloud computing environment, as described in greater detail with regard to FIGS. 4 and 5.

Each one of client computer systems 130 represents a platform configured to exchange requests and responses in a protocol (e.g., Hypertext Transfer Protocol (HTTP) requests and HTTP responses). For example, each one of client computer systems 130 can be an HTTP client, such that each of client computer systems 130 can transmit an HTTP request and receive an HTTP response to exchange data (e.g., HTML files, image files, query results, etc.).

Each user of client computer systems 130 is connected to enterprise computing environment 100 and can perform a search using internet and/or intranet applications of client computer systems 130. In one embodiment, a first user and a second user connected to enterprise computing environment 100 may perform a first and second search, respectively. It may be that the first and second search are similar searches, responsive to determining that the content of the search request for the first and second search are similar (e.g., similar keywords in the search request). A "similar search," as used herein, refers to two or more searches performed by at least one user connected to enterprise computing environment 100, where search content for each of the two searches (e.g., keywords) represent the same subject matter. In one embodiment, two search requests can be determined to be similar searches by comparing keywords of the two search requests.

Each one of web services 140 represents a platform configured to exchange protocol requests and responses (e.g., HTTP requests and HTTP responses). For example, each one of web services 140 can be an HTTP server, such that data can be exchanged with enterprise computing environment 100. Web services 140 can respond to an HTTP request (e.g., a protocol request originating from client computer system 130) by providing an HTTP response. For example, an HTTP response can include: status information, server information, entity metadata information, and body content.

Gateway computer system 110 represents a platform configured to exchange protocol requests and responses. For example, gateway computer system 110 can be a proxy server that retrieves protocol requests from client computer systems 130, transmits retrieved protocol requests to web services 140, and retrieves protocol responses from web services 140. In this embodiment, gateway computer system 110 includes application program 112 that, stores in storage 114 information regarding searches performed by each user connected to enterprise computing environment 100, determines whether similar searches are performed by users connected to enterprise computing environment 100, and modifies a protocol response originating from web services 140 to include additional information, as described in greater detail below.

Application program 112 represents program functionality for storing search session information in storage 114 for each user connected to enterprise computing environment 100. A "search session," as used herein, refers to a time period for which a user connected to enterprise computing environment 100 performs one or more related searches. In one embodiment, application program 112 can determine that a search session for a user connected to enterprise computing environment 100 is complete, if the user is idle for longer than a specified threshold, or performs subsequent searches that are not similar from previously performed searches in the previous search session. For example, a first search session and a second search session for a first user connected to enterprise computing environment 100 may involve searches related to a malfunctioning display device and a malfunctioning keyboard, respectively. Search session information for each search session can include: content of search requests for each respective search session (e.g., keywords in a search request), contact information of a user conducting each respective search session (e.g., the first user connected to enterprise computing environment 100), and a navigational history for each respective search session (e.g., one or more accessed web pages). Accordingly, once a search session for a user connected to enterprise computing environment 100 is complete, application program 112 stores the user's search session information for subsequent use, as described in greater detail below.

Application program 112 also represents program functionality for identifying content of search requests and determining whether a similar search was previously performed by users connected to enterprise computing environment 100. In one embodiment, application program 112 can parse a search request to obtain keywords (i.e., content) of the search request. Application program 112 can access search session information stored in storage 114 to determine whether to classify searches performed by users connected to enterprise computing environment 100 as similar searches.

For example, a search performed by a user connected to enterprise computing environment 100 may involve an error code received by the user while operating a word processing application on one of client computer systems 130. Application program 112 identify keywords in a search request of the search (e.g., "received," "Error Code: 1452B12," "word processing application"). Application program 112 can subsequently access search session information in storage 114 to determine whether keywords from previous search sessions represent the same subject matter as the identified keywords from the search performed by the user.

Application program 112 also represents program functionality for modifying protocol responses that are retrieved from web services 140. Application program 112 can receive a protocol response from web services 140 for a search request performed by a user of a first of client computer systems 130 connected to enterprise computing environment 100, and modifies the received protocol before sending the modified protocol to the first of client computer systems 130, responsive to determining that a similar search was previously performed by users connected to enterprise computing environment 100. Application program 112 can modify a received protocol response by including a portion of information from the similar search. For example, application program 112 can include Hypertext Markup Language (HTML) in the body content of a received protocol response (e.g., HTTP response) to include contact information of another user that performed a similar search and/or one or more webpages that the other user referenced during their respective search session.

Storage 114 represents a storage repository that contains search session information for each user connected to enterprise computing environment 100. Storage 114 can include a data table for each search session of a user connected to enterprise computing environment 100, wherein the table can contain content for a user's search session (e.g., keywords of a search request), a user's contact information, and a navigational history for a user's search session. For example, stored search session information for a first search session of a user connected to enterprise computing environment 100 can include: keywords of search requests from searches performed during the first search session (e.g., "spacebar", "not working, "not responding," "model number: 12345," "frozen," etc.), a name of the user, an e-mail address of the user, etc., and the webpages (e.g., blogs and forums) visited by the user during the first search session.

In one embodiment, an intranet network (e.g., a network 120) is provided to enable internal enterprise network connectivity between client computer systems 130 and gateway computer system 110. Furthermore, an internet network (e.g., another network 120) can be provided to enable exchange of protocol requests and responses with web services 140.

Figure 2:
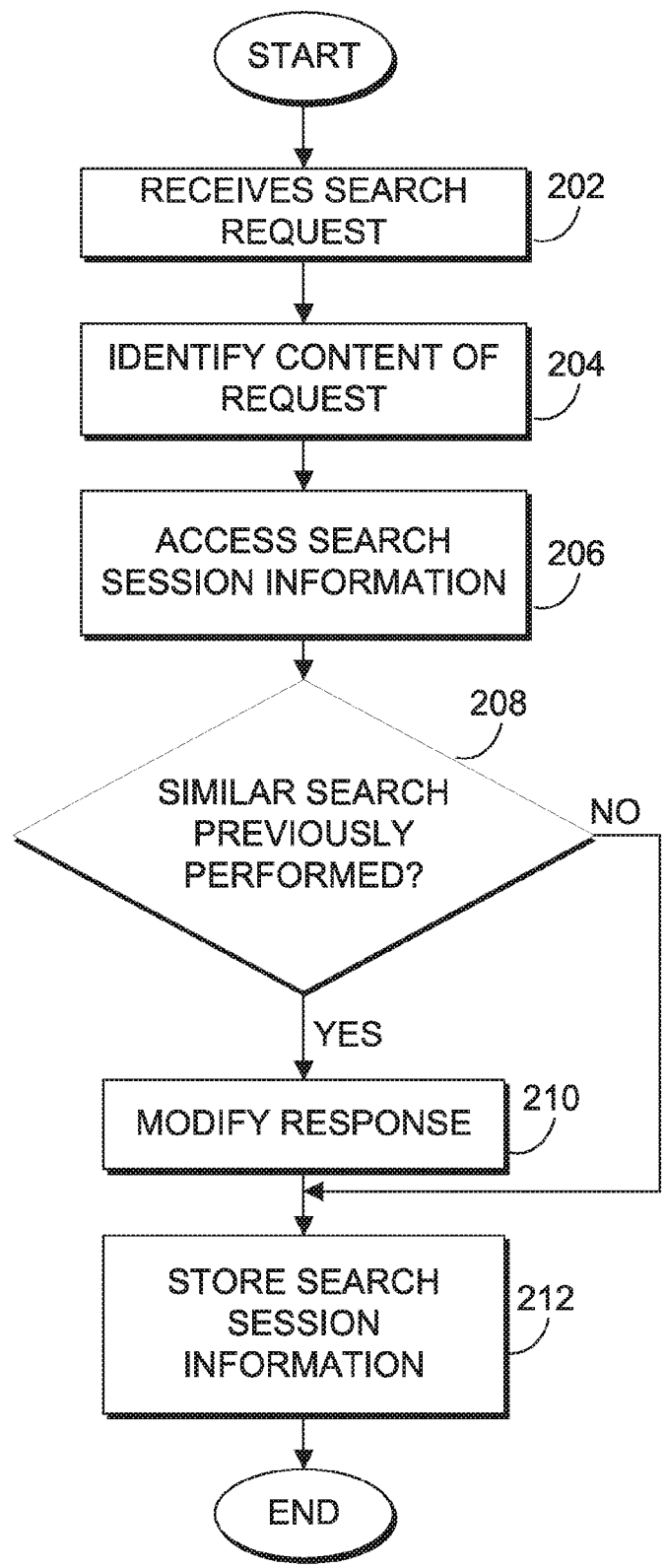
FIG. 2 is a flowchart illustrating operational steps for modifying a protocol response, in accordance with an embodiment of the present invention.

FIG. 2 is a flowchart illustrating operational steps for modifying a protocol response, in accordance with an embodiment of the present invention. In this embodiment, application program 112 receives a search request submitted by a user connected to enterprise computing environment 100 (step 202). Application program 112 identifies the content of the received search request (e.g., keywords of the search request) (step 204). Application program 112 accesses search session information stored in storage 114 (step 206). Application program 112 determines whether a similar search was previously performed by users connected to enterprise computing environment 100 (decision 208). If, application program 112 determines that a similar search was previously performed ("yes" branch, decision 208), then application program 112 modifies a protocol response that is received from web services 140 (step 210). In one embodiment, after application program 112 determines that a similar search was previously performed ("yes" branch, decision 208), then application program 112 can store search session information in storage 114 (step 212). If, application program 112 determines no similar search was previously performed by users connected to enterprise computing environment 100 ("no" branch, decision 208), then application program 112 stores search session information for the received search request in storage 114 (step 212). Search session information is stored, such that the search session information can be referenced to determine whether a future search request is similar to search requests previously performed by users connected to enterprise computing environment 100.

Figure 3:
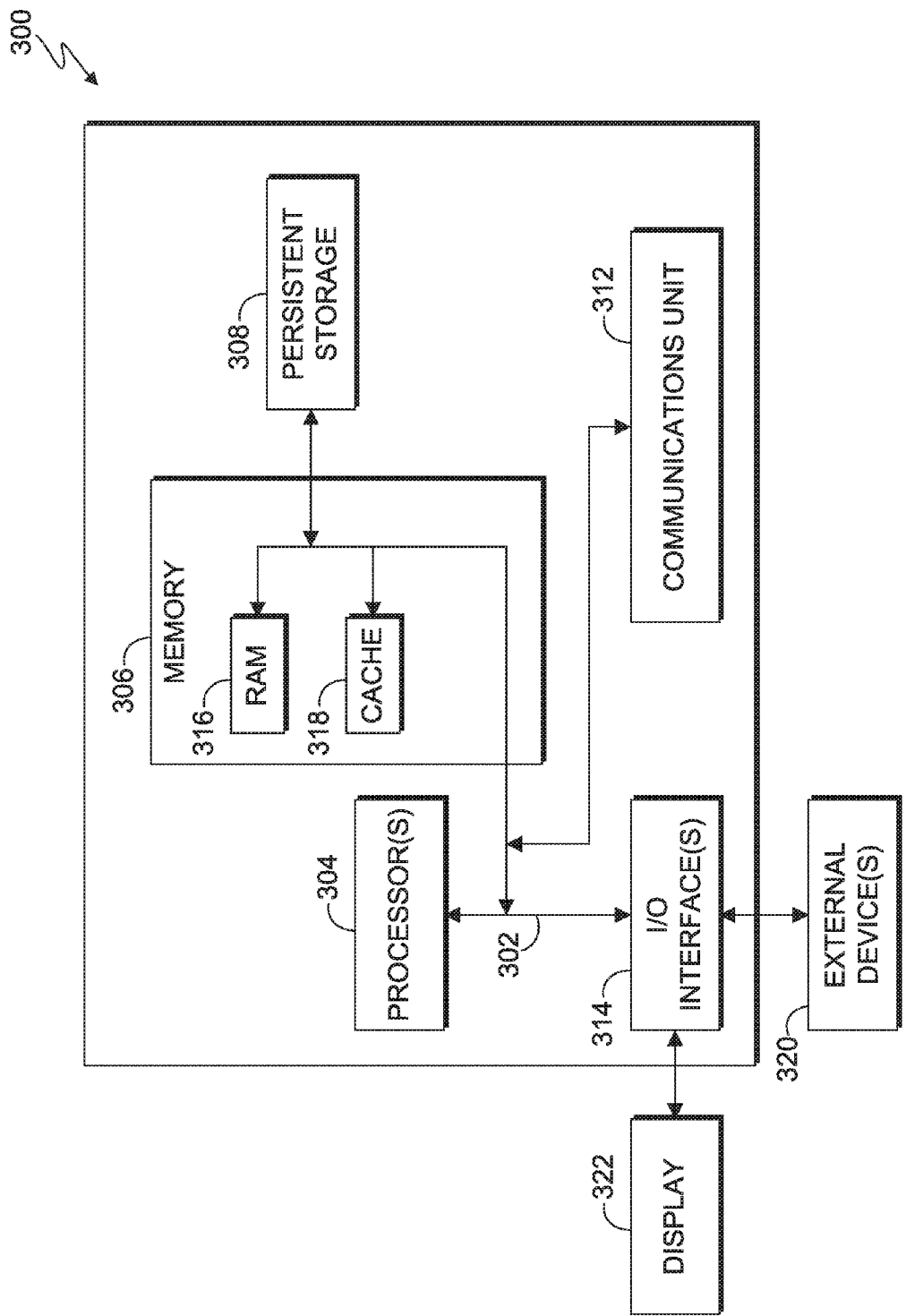
FIG. 3 is a block diagram of internal and external components of the computer systems of FIG. 1, in accordance with an embodiment of the present invention.

FIG. 3 is a block diagram of internal and external components of the computer systems of FIG. 1, in accordance with an embodiment of the present invention. It should be appreciated that FIG. 3 provides only an illustration of one implementation and does not imply any limitations with regard to the environments in which different embodiments may be implemented. In general, the components illustrated in FIG. 3 are representative of any electronic device capable of executing machine-readable program instructions. Examples of computer systems, environments, and/or configurations that may be represented by the components illustrated in FIG. 3 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 300 includes communications fabric 302, which provides for communications between one or more processors 304, memory 306, persistent storage 308, communications unit 312, and one or more input/output (I/O) interfaces 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer-readable storage medium that is also part of persistent storage 308.

Communications unit 312 provides for communications with other computer systems or devices via a network (e.g., network 120). In this exemplary embodiment, communications unit 312 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 312 (e.g., via the Internet, a local area network or other wide area network). From communications unit 312, the software and data can be loaded onto persistent storage 308.

One or more I/O interfaces 314 allow for input and output of data with other devices that may be connected to computer system 300. For example, I/O interface 314 can provide a connection to one or more external devices 320, such as a keyboard, computer mouse, touch screen, virtual keyboard, touch pad, pointing device, or other human interface devices. External devices 320 can also include portable computer-readable storage media such as, for example, thumb drives, portable optical or magnetic disks, and memory cards. I/O interface 314 also connects to display 322.

Display 322 provides a mechanism to display data to a user and can be, for example, a computer monitor. Display 322 can also be an incorporated display and may function as a touch screen, such as a built-in display of a tablet computer.

Figure 4:
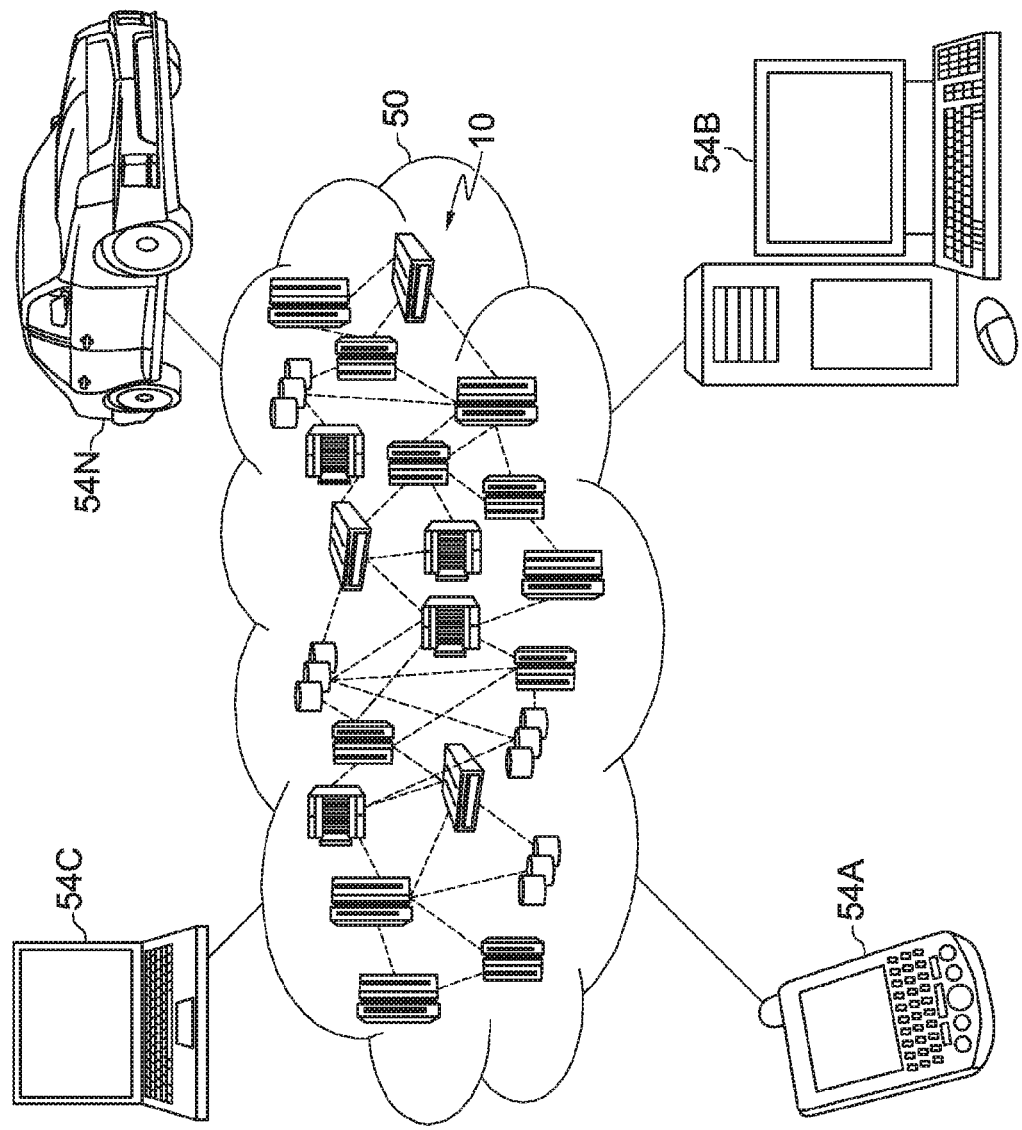
FIG. 4 depicts a cloud computing environment, in accordance with an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. The types of computing devices 54A-N shown in FIG. 9 are intended to be illustrative only and that cloud computing nodes 10 and cloud computing environment 50 can communicate with any type of computerized device over any type of network and/or network addressable connection (e.g., using a web browser).

Figure 5:
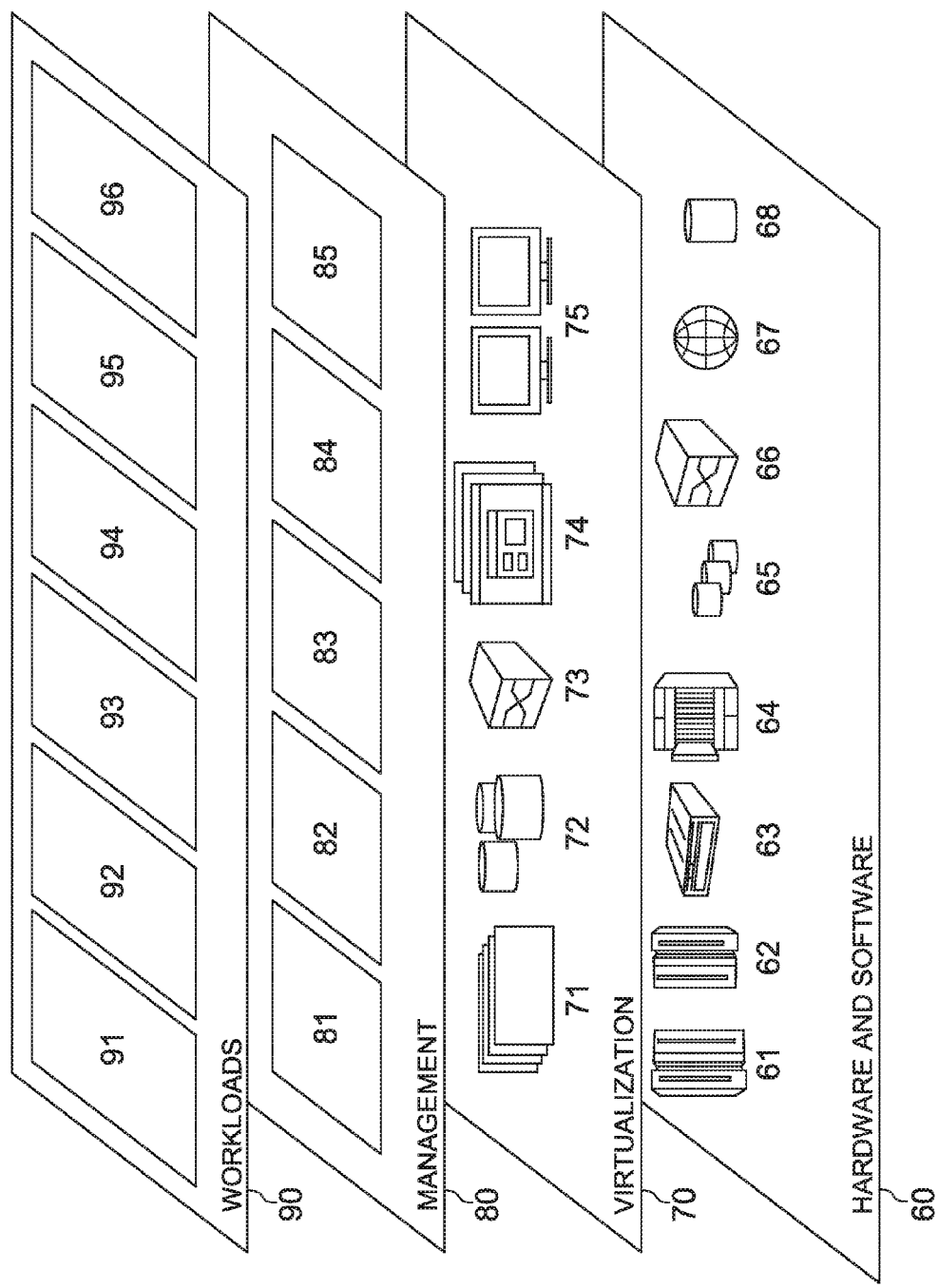
FIG. 5 depicts abstraction model layers, in accordance with an embodiment of the present invention.

Referring now to FIG. 5, a set of functional abstraction layers provided by cloud computing environment 50 (FIG.

4) is shown. The components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enterprise computing environment 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product comprising:
   one or more computer readable storage media and program instructions stored on the one or more computer readable storage media, the program instructions comprising:
   program instructions to receive, by a gateway computer system from a client computer system, a first search request, wherein the gateway computer system and the client computer are connected to an enterprise computing environment;
   program instructions to identify keywords of the first search request;
   program instructions to transmit a request in a protocol for the first search request to a web service, wherein the protocol is a Hypertext Transfer Protocol (HTTP);
   program instructions to receive a response in the protocol for the first search request from the web service, wherein the response includes body content;
   program instructions to determine whether the first search request is similar to a previously submitted search request, based on identified keywords of the first search request and keywords of the previously submitted search request, wherein the previously submitted search request was submitted by a user from the enterprise computing environment, wherein the previously submitted search request was received and stored by the gateway computer system, and wherein one or more webpages visited by the user during a prior search session corresponding with the previously submitted search request are recorded;
   program instructions to, responsive to determining that the first search request is similar to the previously submitted search request, modify, by the gateway computer system, the body content of the response to include Hypertext Markup Language (HTML) containing contact information of the user that submitted the previously submitted search request and the recorded one or more webpages; and
   program instructions to transmit the modified response from the gateway computer system to the client computer system from which the first search request originated.

2. The computer program product of claim 1, wherein the program instructions to determine whether the first search request is similar to a previously submitted search request, based on identified keywords of the first search request and keywords of the previously submitted search request comprise:
   program instructions to compare keywords of the previously submitted search request with the identified keywords of the first search request, wherein an entry of a storage repository containing information for the previously submitted search request include: the keywords of the previously submitted search request, contact information of a user that of the previously submitted search request, and a web page navigational history for the user of the previously submitted search request; and
   program instructions to, responsive to determining that the content of the previously submitted search request represents the same subject matter as the identified content of the first search request, classify the first and second search requests as similar search requests.

3. The computer program product of claim 2, wherein the web page navigational history of the user that previously submitted the search request includes a web page that the user accessed, after the client computer system connected to the enterprise computing environment from which the previously submitted search request originated receives the response for the previously submitted search request.

4. The computer program product of claim 1, wherein the enterprise computing environment includes at least: a client computer system, a gateway computer system, and a web service, such that users of client computer systems connected to the enterprise computing environment can submit search requests and for each submitted search request, receive a response that originates from the web service.

5. The computer program product of claim 1, wherein the program instructions stored on the one or more computer readable storage media further comprise:
   program instructions to, responsive to determining that the first search request is similar to the previously submitted search request, modify the response to include the web page navigational history of the user that previously submitted the similar search request.

6. A computer system comprising:
   one or more computer processors;
   one or more computer readable storage media;
   program instructions stored on the computer readable storage media for execution by at least one of the one or more processors, the program instructions comprising:
   program instructions to receive, by a gateway computer system from a client computer system, a first search request, wherein the gateway computer system and the client computer are connected to an enterprise computing environment;
   program instructions to identify keywords of the first search request;
   program instructions to transmit a request in a protocol for the first search request to a web service, wherein the protocol is a Hypertext Transfer Protocol (HTTP);
   program instructions to receive a response in the protocol for the first search request from the web service, wherein the response includes body content;
   program instructions to determine whether the first search request is similar to a previously submitted search request, based on identified keywords of the first search request and keywords of the previously submitted search request, wherein the previously submitted search request was submitted by a user from the enterprise computing environment, wherein the previously submitted search request was received and stored by the gateway computer system, and wherein one or more webpages visited by the user during a prior search session corresponding with the previously submitted search request are recorded;

program instructions to, responsive to determining that the first search request is similar to the previously submitted search request, modify, by the gateway computer system, the body content of the response to include Hypertext Markup Language (HTML) containing contact information of the user that submitted the previously submitted search request and the recorded one or more webpages; and program instructions to transmit the modified response from the gateway computer system to the client computer system from which the first search request originated.

7. The computer system of claim 6, wherein the program instructions to determine whether the first search request is similar to a previously submitted search request, based on identified keywords of the first search request and keywords of the previously submitted search request comprise:

program instructions to compare keywords of the previously submitted search request with the identified keywords of the first search request, wherein an entry of a storage repository containing information for the previously submitted search request include: the keywords of the previously submitted search request, contact information of a user that of the previously submitted search request, and a web page navigational history for the user of the previously submitted search request; and program instructions to, responsive to determining that the content of the previously submitted search request represents the same subject matter as the identified content of the first search request, classify the first and second search requests as similar search requests.

8. The computer system of claim 6, wherein the enterprise computing environment includes at least: a client computer system, a gateway computer system, and a web service, such that users of client computer systems connected to the enterprise computing environment can submit search requests and for each submitted search request, receive a response that originates from the web service.

9. The computer system of claim 6, wherein the program instructions stored on the one or more computer readable storage media further comprise:

program instructions to, responsive to determining that the first search request is similar to the previously submitted search request, modify the response to include the web page navigational history of the user that previously submitted the similar search request.

* * * * *